US012225009B2

(12) United States Patent
Park et al.

(10) Patent No.: US 12,225,009 B2
(45) Date of Patent: Feb. 11, 2025

(54) CONTENT AUTHORIZATION AND DELIVERY

(71) Applicant: Comcast Cable Communications, LLC, Philadelphia, PA (US)

(72) Inventors: Kyong Park, Haverford, PA (US); Jason Burgess, Highlands Ranch, CO (US); Garey Hassler, Castle Pines, CO (US); Greg Rutz, Arvada, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 219 days.

(21) Appl. No.: 16/146,817

(22) Filed: Sep. 28, 2018

(65) Prior Publication Data
US 2020/0106778 A1 Apr. 2, 2020

(51) Int. Cl.
*H04L 9/40* (2022.01)

(52) U.S. Cl.
CPC ............ *H04L 63/10* (2013.01); *H04L 63/08* (2013.01)

(58) Field of Classification Search
CPC ..... H04L 63/08; H04L 63/10; H04L 65/4084; H04L 67/02
See application file for complete search history.

(56) References Cited

U.S. PATENT DOCUMENTS

| 9,060,031 | B1* | 6/2015 | Taylor | H04L 61/4594 |
| 9,950,930 | B2* | 4/2018 | Yoo | C01B 32/19 |
| 9,996,600 | B1* | 6/2018 | Walavalkar | G06Q 30/0641 |
| 10,089,654 | B1* | 10/2018 | Chang | G06F 3/04817 |
| 10,131,803 | B2* | 11/2018 | Sohn | C01B 32/19 |
| 10,936,691 | B1* | 3/2021 | Guo | H04L 67/53 |
| 2002/0019943 | A1* | 2/2002 | Cho | G06F 21/101 |
| | | | | 713/193 |
| 2005/0223093 | A1* | 10/2005 | Hanson | H04L 67/535 |
| | | | | 709/224 |
| 2011/0126296 | A1* | 5/2011 | Moore | H04L 63/168 |
| | | | | 726/28 |
| 2013/0060661 | A1* | 3/2013 | Block | G06Q 30/02 |
| | | | | 726/28 |
| 2014/0279852 | A1* | 9/2014 | Chen | G06F 16/43 |
| | | | | 707/696 |
| 2014/0344345 | A1* | 11/2014 | Venkatraman | G06F 16/957 |
| | | | | 709/203 |
| 2015/0350186 | A1* | 12/2015 | Chan | H04L 63/0815 |
| | | | | 726/9 |

(Continued)

OTHER PUBLICATIONS

Amir Rafi • Carlton Shepherd • Konstantinos Markantonakis; A First Look at Digital Rights Management Systems for Secure Mobile Content Delivery; 2023 IEEE 22nd International Conference on Trust, Security and Privacy in Computing and Communications (TrustCom) (2023, pp. 549-558); (Year: 2023).*

(Continued)

*Primary Examiner* — Roderick Tolentino
*Assistant Examiner* — Chao Wang
(74) *Attorney, Agent, or Firm* — Banner & Witcoff, Ltd.

(57) ABSTRACT

Authorization and delivery of content may employ uniform resource signing packages. A uniform resource signing package may comprise access parameters for a content item, user, and/or device, and may be sent to the client as a uniform resource query parameter. The client may include the uniform resource signing package in future requests associated with the content item.

52 Claims, 6 Drawing Sheets

(56) References Cited

U.S. PATENT DOCUMENTS

2015/0365450 A1* 12/2015 Gaunt .................... H04L 65/65
709/231
2016/0337369 A1* 11/2016 Sanso ................ H04L 63/0807
2017/0026346 A1* 1/2017 Moore ................. H04L 63/062

OTHER PUBLICATIONS

Igor Faynberg • Hui-Lan Lu • Herbert Ristock; On dynamic access control in Web 2.0 and beyond: Trends and technologies; Bell Labs Technical Journal (vol. 16, Issue: 2, 2011, pp. 199-218); (Year: 2011).*
Mannens, E. • Van Deursen, D. • Van de Walle, R.; Making space & time uniformly identifiable in the Web via Media Fragments; 2011 IEEE Consumer Communications and Networking Conference (CCNC) (2011, pp. 141-146); (Year: 2011).*
Brandenburg et al., "URI Signing for CDN Interconnection (CDNI)," https://tools.ietf.org/html/draft-ietf-cdni-uri-signing-13, Oct. 30, 2017.

* cited by examiner

CONTENT AUTHORIZATION AND DELIVERY

BACKGROUND

User devices (e.g., smartphones, video streaming devices, personal computers, etc.) are now being offered an ever-expanding universe of content (e.g., streaming movies, television programs, online video content, etc.), and this increases the burden on a content provider in many ways. One such burden relates to authorizing access to the content. It may sometimes take a content delivery network (CDN) several seconds to authorize a particular user and/or device to access a particular content item, and that delay can detract from the user experience.

SUMMARY

The following summary presents a simplified summary of certain features. The summary is not an extensive overview and is not intended to identify key or critical elements.

Systems, apparatuses, and methods are described for using uniform resource identifier (URI) signing packages to assist in controlling access to content items. A content access server may generate a signing package comprising access parameters for a user device and content item, and the user device may include the signing package in content requests to a CDN computing device. The user device may send the signing package as a uniform resource locator (URL) query parameter to help ensure that the signing package remains intact through intermediate routing. The user device may receive a content response instructing the user device to store a copy of the signing package as a cookie. The cookie may serve as a durable form of access restriction that may be supported even by legacy user devices with basic browser functionality, and the use of the signing package and the content access server may alleviate some burden from the CDN computing device.

To accommodate changes in access parameters (e.g., due to a sporting event blackout, change in playback privileges, etc.), a previously-granted signing package may be revoked or modified, and a subsequent content request may be redirected to the content access server. The content access server may generate a new signing package, with new access parameters, for the user device and content item. The package may comprise an expiration date/time permitting periodic opportunities for the content access server to re-evaluate access parameters for a particular user device and/or content item.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
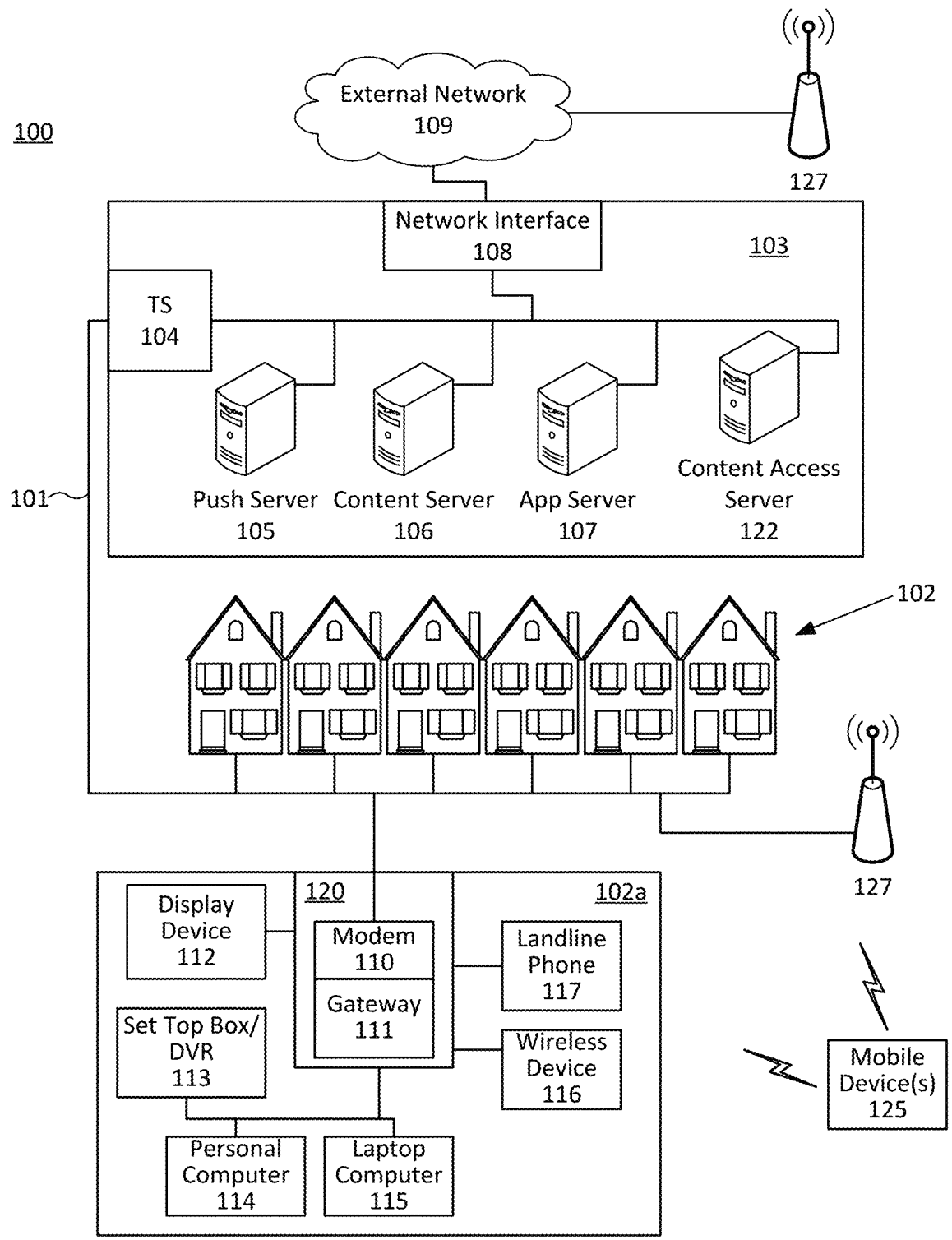
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured to manage communications among those devices, to manage communications between those devices and back-end devices such as servers 105-107 and 122, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. An application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as the content access server 122 (described below), additional push, content, and/or application servers, and/or other types of servers. Although shown separately, the push server 105, the content server 106, the application server 107, the content access server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a content item such as a video, a game, one or more images, software, audio, text, webpage(s), and/or other content.

Figure 2:
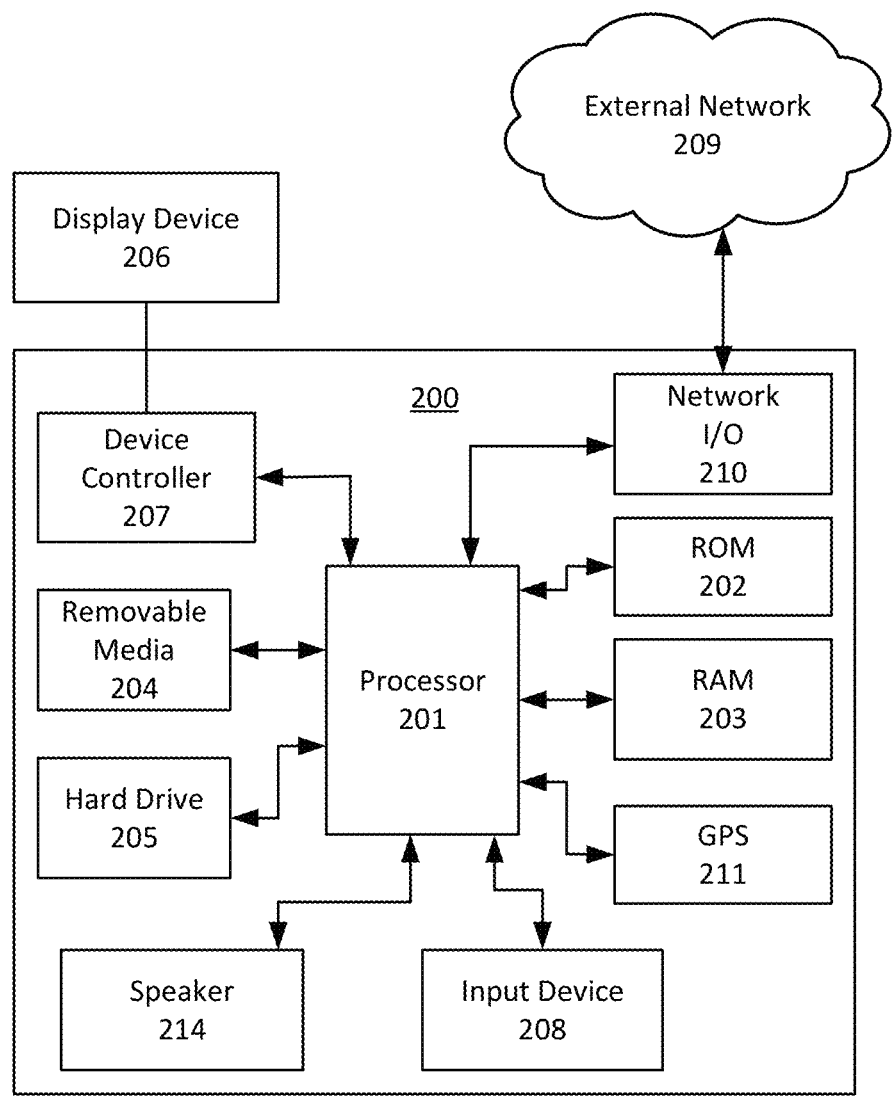
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., CDN computing devices, user devices, servers, etc.). The computing device 200 may comprise one or more processors 201, which may execute instructions of a computer program to perform any of the functions described herein. The instructions may be stored in a read-only memory (ROM) 202, random access memory (RAM) 203 (including volatile, non-volatile, memristors, NVRAM, etc.), removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device, which may be coupled using any desired analog or digital connection, such as component video, High-Definition Multimedia Interface (HDMI), etc.) and a speaker 214, and may comprise one or more output device controllers 207, such as a video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200. Geographic position may also be determined within a premises using local wireless transmissions, such as BLUETOOTH.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. A memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be a microprocessor that accesses programming instructions or other data stored in a ROM and/or hardwired into the IC. An IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
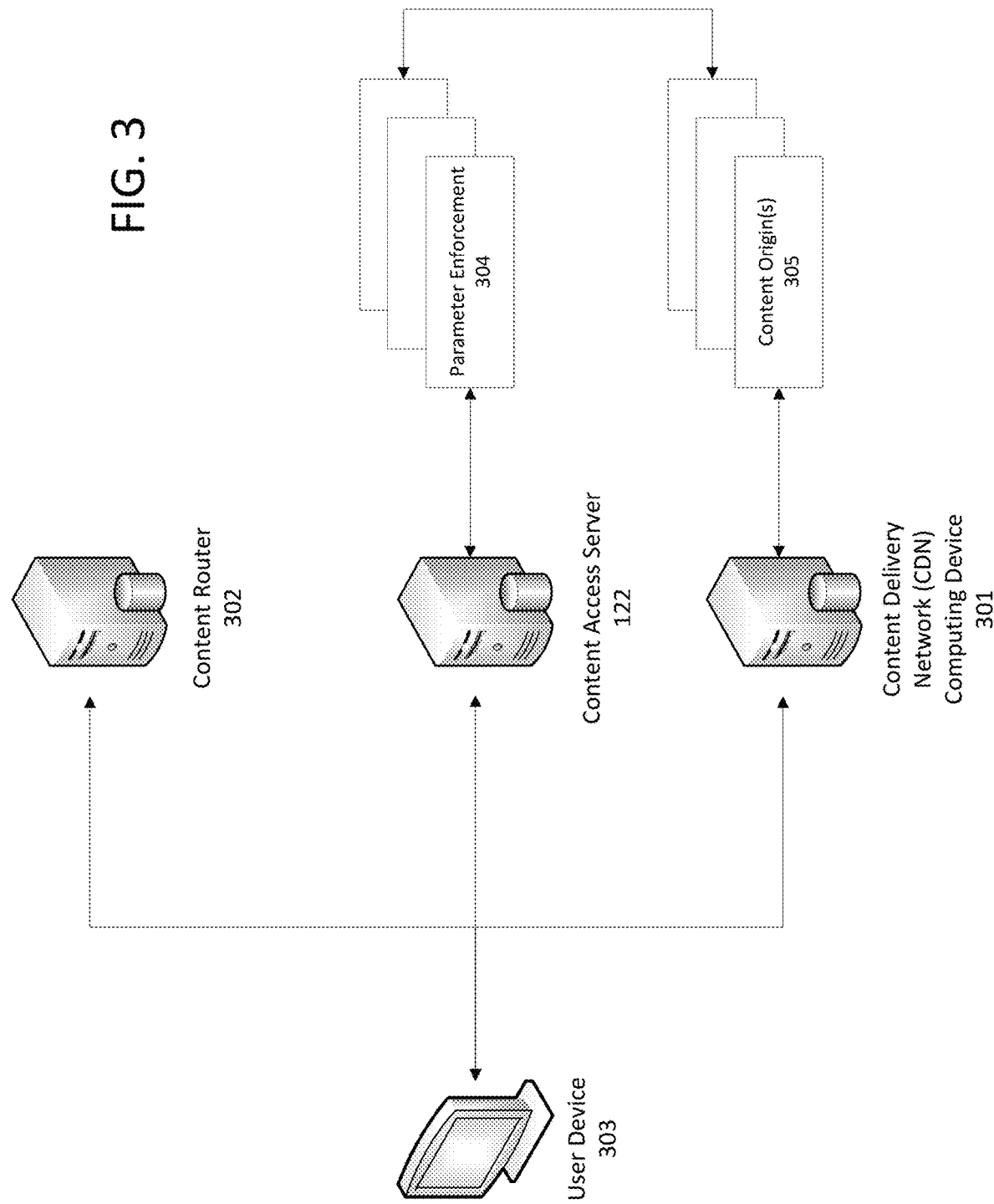
FIG. 3 shows a simplified example of the network in FIG. 1.

FIG. 3 shows a simplified example of the network in FIG. 1, highlighting components that will be discussed further below. The content access server 122 may be a computing device (or devices) that may retain information indicating access restrictions for a variety of content items. Content items (e.g., movies, television programs, uploaded Internet videos, etc. that are available for on-demand streaming and/or linear/live streaming) may be associated with availability access requirements that indicate a date/time window when the content items are available. A source, such as content origin 305, of a content item, such as an on-demand movie, may require that the movie only be available for streaming during certain days and/or times of day (e.g., during a release period).

A content item may be associated with a geographic requirement. A content source may indicate that the content item is only available to user devices that are within a predetermined geographic region (e.g., a ZIP code, a neighborhood, a GPS coordinate range, a single premises, etc.). The content source may also indicate that the content item should only be made available to certain users, such as users who have subscribed to a particular level of service. The content source may also indicate that the content item should only be made available to user devices of a certain type, such as those meeting certain computing resource requirements (e.g., memory space, available bandwidth of connection, etc.) and/or software configurations (e.g., running a particular codec, operating system, decryption protocol, etc.). Any other desired form of content access parameters may also or alternatively be used.

Similar access parameters may be established for other types of content items as well. Linear content, such as ongoing streams carried by various service providers such as NBC, ESPN, HBO, CNN, etc., may have the same types of access restrictions and requirements noted above.

Content items may be limited in a variety of ways. They may be limited in the number of viewings, the number of different user devices, the types of viewing device (e.g., operating systems such as ANDROID and IOS, device classification, configuration, security configuration, etc.), viewing location (e.g., at a user's registered home or away from the home), geographic blackout (e.g., 50-mile radius around a sporting event location), service tier (e.g., user subscription level), availability time(s), the number of simultaneous connections, and/or any other desired type of access control.

The following table shows an example of access parameter information indicating restrictions on content access:

| Content Title (Type) | Content ID | Permitted Time(s) | Permitted User Tier | Permitted Device Type | Geography |
|---|---|---|---|---|---|
| Movie #1 (On Demand) | 2223 | 7/1 (8 am) to 8/1 (8 am) | Tier 3 and above | Tablets, Codec A | Anywhere |
| Sporting Event #1 (Linear) | 5324 | 7/7 (3:30 pm-6 pm) | Tier 2 and above | Any | Blackout 50-mile radius around City A |
| Movie #2 (On Demand) | 2356 | Any | Any | Any | U.S. East Coast Only |

Movie #1 may be an on-demand movie that is only available from July 1, 8 am to August 1, 8 am. Movie #1 might only be available to users who have subscribed to a minimum service level ("Tier 3"), and to tablets and devices running Codec A, but without any geographic restrictions. Sporting Event #1, however, may be a linear football game that is airing July 7 from 3:30 to 6 pm, available to users subscribed to a different minimum service level ("Tier 2"), without device restrictions, but with a geographic blackout indicating that the content item is not available to user devices that are located within a 50-mile radius around City A. While the blackout is listed as a geographic restriction, other categories of users/devices/content may be blacked out as well (e.g., a restriction against certain device types, or against certain times of day, etc.). The Movie #2 is shown with only a geographic parameter, indicating that the movie is only available to user devices on the East Coast of the United States. Of course, the parameters in the above table are merely examples, and other types of parameters may also or alternatively be stored and/or otherwise processed. Also, the parameter data need not be stored as a table, and may be stored in any desired format. The various access restrictions applicable for content may be provided by a content origin 305 (e.g., a source of a movie may provide rules governing access to the movie).

The content access server 122 may receive content requests from a user device 303 and/or from other user devices, and may use the parameters above to determine whether a particular request should be granted. If a content request is to be granted, the content access server 122 may provide the user device 303 with a URI signing package comprising a summary of the access parameters for a particular user, user device, and/or content item. The signing package may be a digitally signed data value that indicates a validity period, such as a date/time range, for which the user device is authorized to access a particular content item. The user device 303 may include the signing package as part of (or otherwise in connection with) a subsequent content request to a CDN computing device 301, to demonstrate that the user device 303 is entitled to receive the requested content. Further example details of the signing package and its use will be discussed further below with respect to FIG. 4A.

The content access server 122 may communicate with one or more additional computing devices to enforce the content access restrictions. Different parameter enforcement computing devices 304 may be used to enforce usage restrictions for different content items (e.g., one computing device might handle restrictions for content from the NBC service, while another computing device might handle restrictions for content from ESPN). Different parameter enforcement computing devices may be used to handle different kinds of restrictions. One parameter enforcement computing device may be responsible for enforcing geographic restrictions on content access, while another may be responsible for confirming a user device 303's IP address is authorized for service. Another parameter enforcement computing device may be responsible for enforcing limitations on a number of user devices 303 that a particular account may support. If applicable, a plurality of parameter enforcement computing devices may be consulted in response to a single request for content, and the content access server 122 may store information indicating the types of requests that should be forwarded to each of the various parameter enforcement computing devices.

Each parameter enforcement computing device 304 may have its own application program interface, specifying parameters that are needed for determining whether a request should be authorized. One parameter enforcement computing device 304 may need to be provided with a content ID for the requested content and account information for the requesting user device 303. Another may need to be provided with the IP address of the user device 303, or a geographic location (e.g., GPS coordinates, ZIP code, street address, etc.) of the user device 303. After a request is received by the content access server 122 (as will be discussed below), the content access server 122 may transmit one or more subsequent requests to one or more corresponding parameter enforcement computing devices, and may receive responses indicating whether the request is permitted by the parameter enforcement computing devices. The response may also indicate conditions for the granted request. A response may indicate that the request is granted, but the grant is only valid for a period of time indicated in the response. If desired, some or all of the parameter enforcement may be handled by the content access server 122 itself, and use of a separate parameter enforcement computing device may be omitted if desired.

There may also be a CDN computing device 301. The CDN computing device 301 may comprise one (or more) computing devices that provide content items to the user devices 303 and/or to other user devices. The CDN computing device 301 may be part of (or comprise) a CDN hierarchy, and may store a content item (e.g., its manifest files, its audio and video files, its metadata, etc.), receive content requests for the content item, process signing packages (from the content requests) to verify that the request is made within a validity period for the content item, and send the content item to a requesting user device 303. If the CDN computing device 301 determines that a particular user device's signing package has expired, the CDN computing device 301 may redirect the user device 303 to the content access server 122, to obtain a new signing package. The CDN computing device 301 may be an Internet Protocol (IP) CDN, handling content items via IP. The CDN computing device 301 may comprise a plurality of caching devices in a hierarchy, and may also communicate with one or more content origins 305 regarding the content. A content origin 305 may be a computing device that initially provides a content item. For example, a new episode of an NBC television program might be initially provided by a computing device associated with NBC, and that computing device may be the content origin for that new episode. The content origin 305 may provide the CDN computing device 301 with the various audio/video fragment files and manifests for the new episode, and may also provide the access restrictions that are to govern the access to the new episode. Those access restrictions may be provided to the parameter enforcement 304 device(s), for use by the content access server 122 in creating the signing packages that are applicable to the new episode.

There may be one or more content routers 302. The content router 302 may assist with directing traffic to the CDN computing device 301. The content router 302 may receive a content route request from a user device and for a requested content item, and may inform the user device 303 of an address (e.g., a URL or URI) of the CDN computing device 301 that is to handle that particular request. The content router 302 may provide load balancing functionality by distributing incoming requests to different CDN computing devices 301. Different CDN computing devices 301 may be responsible for different content items and/or groups of content. One CDN computing device 301 might handle requests for an HD (high definition) version of a movie, while a different CDN computing device 301 might handle requests for an SD (standard definition) version of the movie. One CDN computing device 301 might handle requests for the first half of the movie, and another CDN computing device 301 might handle requests for a second half of the movie. Any other division of responsibilities may be implemented.

There may also be a user device 303. The user device 303 may be any computing device that a user may use to access content from a CDN computing device 301. The user device 303 may be a tablet computer running an Internet browser following the Hypertext Transfer Protocol (HTTP), and may be used to access a video streaming website and request a streaming session of a particular movie. Various devices shown in FIG. 1, such as the display device 112, the set-top-box/digital video recorder 113, the personal computer 114, the laptop computer 115, the wireless device 116, the landline phone 117, and/or the mobile devices 125 may serve as a user device 303. The modem 110 and/or gateway 111 may also be implemented as a user device 303.

Each of the content access server 122, the CDN computing device 301, the content router 302, the user device 303, the parameter enforcement device 304, and the content origin 305 (as well as any other device or element described herein) may be implemented using some or all of the elements shown in FIG. 2. The various elements in FIG. 3 may be replicated and/or duplicated as desired. Although FIG. 3 shows a single content access server 122, a single CDN computing device 301, a single content router 302, and a single user device 303, a network such as that of FIG. 3 may comprise multiple content access servers (each performing some or all operations described in connection with the content access server 122), multiple CDN computing devices (each performing some or all operations described in connection with the CDN computing device 301), multiple content routers (each performing some or all operations described in connection with the content router 302), and multiple user devices (each performing some or all operations described in connection with the user device 303).

Figure 4A:
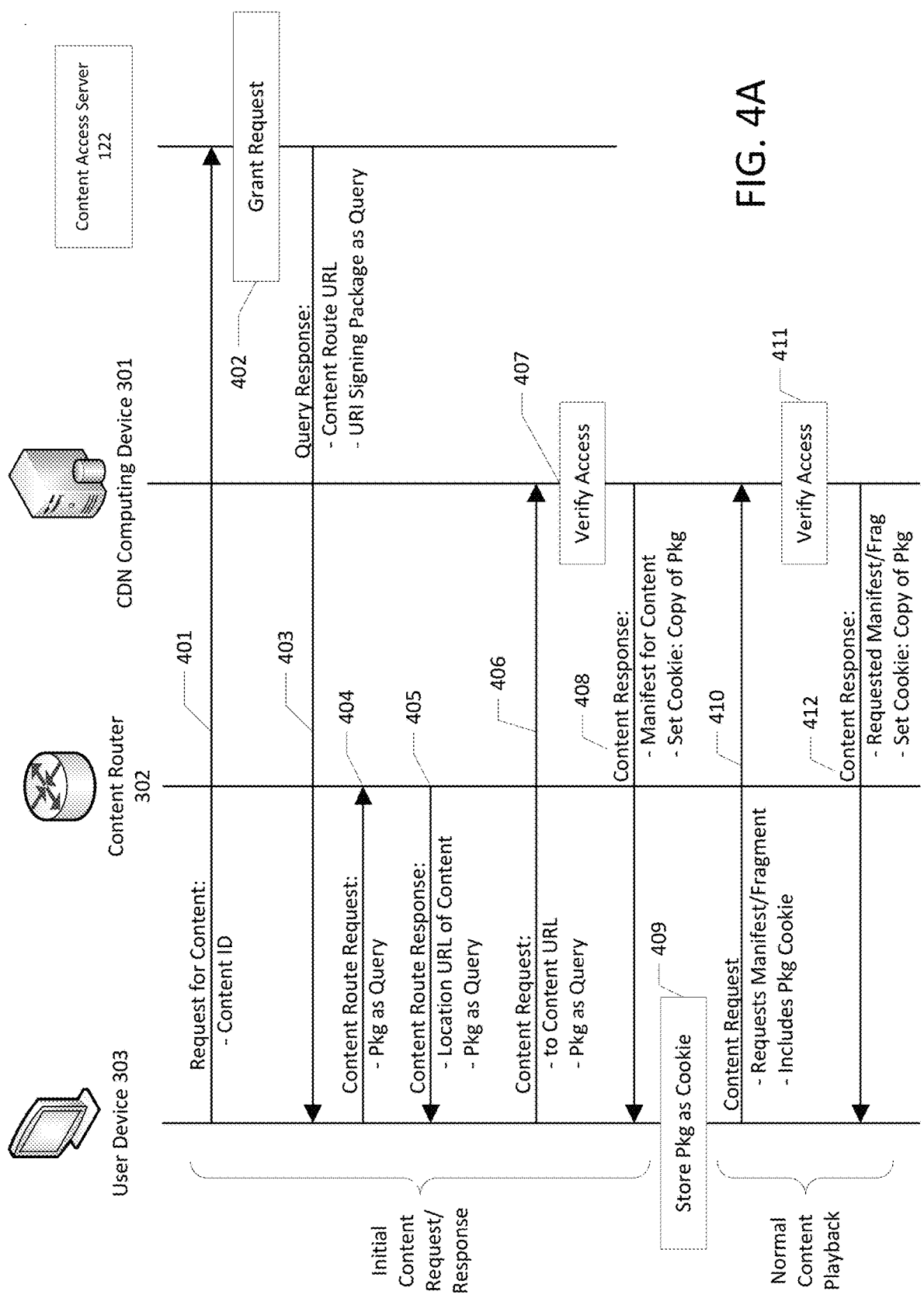
FIGS. 4A-C show an example signaling for managing access to content.
Figure 4B:
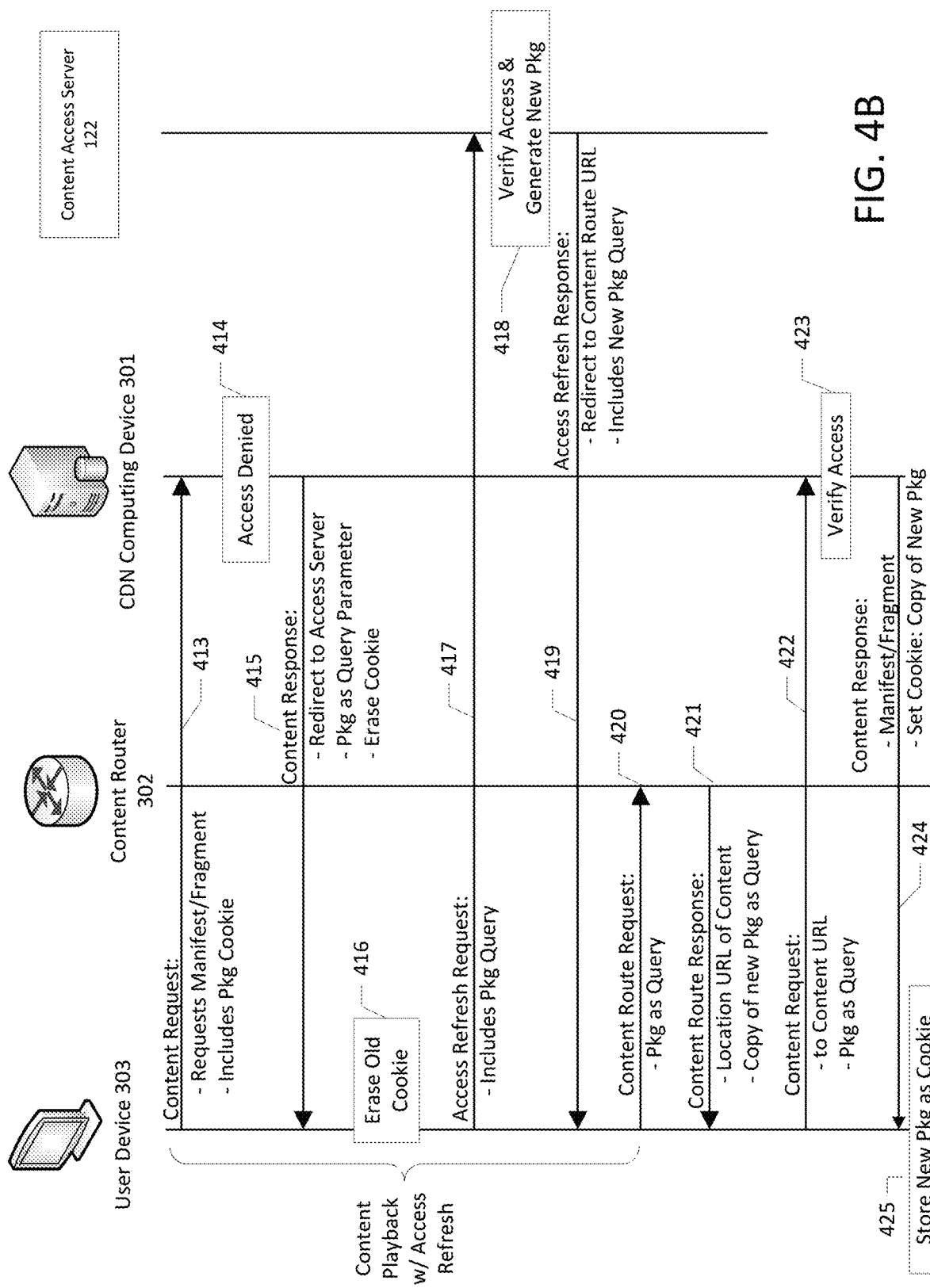

FIGS. 4A & 4B show an example signaling and algorithm flow for requesting a content item, such as a video stream. Although FIGS. 4A and 4B and the discussion below refers to operations being performed by various elements shown in FIGS. 4A and 4B, some or all of those operations may also or alternatively be performed by one or more other computing devices. The user device 303 may establish a data session to communicate with a content source, such as a website (e.g., www.website.com) offering streaming movie downloads. Such a website may have coordinated with the content access server 122 to have the content access server 122 handle authorization of requests for content offered by the website. For example, the website may be a content origin 305, providing access parameters to a parameter enforcement device 304 for use by a content access server 122. In connecting with the website, the user may have logged in by providing a user name and password, or the device may have been pre-registered, resulting in a communication session. The session may be indicated by a session token, which the user device 303 may provide to identify itself in the various communications below.

The website may offer a program listing of various items of available video content (e.g., movies, uploaded videos, programming from services or channels such as ESPN, HBO, NBC, etc.). The program listing may comprise one or more content indications (e.g., title, file path/name, file number, series name, episode number, etc.) for each listed content item to indicate the various pieces of available content, as well as an indication of one or more content access servers 122 that are responsible for administering access to the items of available content. Access to each different video program may be administered by a different content access server 122, and/or a content access server 122 may handle a variety of content access parameters for a plurality of different content items.

A user may select a content item, such as a movie, for viewing, and the user device 303 may send a request 401 for content to the corresponding content access server 122. The request may comprise a content indication for the requested movie. For example, a content indication may be a URL for the requested movie (e.g., www.website.com/action-movies/action-movie#35245), as well as information associated with the user device 303 and/or individual user(s) who are making the request (e.g., a username for the user who caused the user device 303 to send the request 401). The request 401 may comprise client characteristic information, such as an indication of the user (e.g., a user name for a video service account) and/or household account, indication of the user device 303 (e.g., media access control (MAC) address, Internet Protocol (IP) address, serial number, device name, device type, device model, device capabilities, memory, processing ability, resource load, configuration, etc.), session information indicating a pending or new session for the requested movie (e.g. a session token from an established session), account information (e.g., a username or account number of a user who has subscribed to a particular service level, movie channel, streaming service, etc.—the account information may be derived from the session information), geographic location of the user device 303 (e.g., postal ZIP code, global positioning system (GPS) coordinates), premises location of the user device 303 (e.g., location within a premises, such as room location detected via local wireless such as BLUETOOTH), security system type and/or version, and/or any other information that may be useful in determining whether the content access server 122 should grant access to the requested movie. The client characteristic information may be stored and/or passed by the user device 303 as a token indicating the various characteristics above, and may be included in any of the communications involving the client device 303, to provide an easy way for other devices to evaluate the user device 303 and/or a content request.

The content access server 122 may receive the request 401 for content, and may consult the various access parameters (and parameter enforcement devices 304) discussed above to determine whether the request should be granted 402. The access parameters may be stored in memory of, and/or in memory otherwise accessible by, the content access server 122. As noted above, there may be one or more additional parameter enforcement computing devices 304 that are responsible for enforcing particular restrictions for different content items and/or different restriction types, and in granting 402 the request, the content access server 122 may transmit one or more requests to the parameter enforcement computing devices 304, and may receive corresponding responses approving or denying the requests. The content access server 122 may grant 402 a request for content 401 after receiving approvals from the various parameter enforcement computing devices 304 consulted in this process. If desired, some or all of the various parameter enforcement processes may be performed by the content access server 122 itself.

If the request 401 is to be granted, the content access server 122 may prepare a URI signing package for the content request (although the package may also or alternatively have been prepared by the content access server 122 prior to receiving the request 401 and based on user preferences, usage history, etc.). The signing package may be a digitally-signed data structure that comprises information detailing the granted access to the content, and may be used by a user device 303 to indicate the access grant in association with requests for assets of the movie, such as manifest files and audiovisual fragments. The signing package may comprise a signed version of data that comprises some or all of the following types of information:

Content Indication Information—information that indicates the content item for which the signing package applies. This can be any desired indication value, such as a content name, content number, fully-qualified domain name (FQDN), partial file path name, etc. An example content indication may be as follows:
"http://my.cdn.com/movies/action/action-movie#35245"
Wildcard values may be used to indicate larger groups of content. For example, if the content access server 122 wished to grant access to all action movies offered by the "my.cdn.com" service, a wildcard (e.g., an asterisk "*") may be used in the content indication to omit an asset file name, path name, and/or portion thereof, such as in the following:
"http://my.cdn.com/movies/action/*"
If the movie (e.g., "action-movie#35245") were available from multiple different websites (e.g., "my.cdn.com" and "www.moviedownloads.com", the content access server 122 may grant access to all of those websites by leaving the pathname portion of the content indication as a wildcard:
"*/action-movie#35245/*
The movie may be available as a plurality of different audiovideo files, each containing a portion (e.g., 2-seconds) of the movie. If the content access device 122 is granting access to all of the following fragments:
http://my.cdn.com/ . . . /action-movie#35245/fragment_00000001.ts
http://my.cdn.com/ . . . /action-movie#35245/fragment_00000002.ts http://my.cdn.com/ . . . /action-movie#35245/fragment_00000003.ts
http://my.cdn.com/ . . . /action-movie#35245/fragment_00000004.ts
http://my.cdn.com/ . . . /action-movie#35245/fragment_00000004.ts The signature may use the following partial address path indicating the fragments:
/.*Vaction-movie#35245V.*/ to grant access to all fragments under the pathname "action-movie#35245."

The content access server 122 may grant access to just a portion of the movie, such as the first 1000 fragments, by using wildcards based on the naming convention of the fragments. For example, folder above, a wildcard may be used to grant access to the first 1000 fragments (e.g., fragments 00000000-00000999) as follows:
"http://www.my-cdn.com/ . . . /action-movie#35245/fragment_00000*"

Wildcard values may also or alternatively be used for other elements in the signing package discussed below.

Validity Period—the signing package may comprise information indicating one or more time periods during which the user device 303 is granted access to the content item. The user device 303 may be granted access to a movie for a time period from 1 hour prior to the date of issue of the signing package to 30 minutes after the date of issue. The validity period may be set to be as short or as long as desired. A shorter validity period may result in more frequent requests for new signing packages, and may allow more frequent opportunities for the content access server 122 to add a new restriction on the content item. A longer validity period may result in fewer requests for new signing packages, but may result in fewer opportunities to add new restrictions on the content item. If the content access server 122 is aware of an upcoming restriction, such as an upcoming blackout for a sporting event running from 2 pm-6 pm, then the content access server 122 may set the validity period of the signing package to expire at the time that the blackout is to begin. The validity period may be based on a program schedule (e.g., a validity period may be set as the entire scheduled duration of a program; additional validity periods may be added if the program exceeds the scheduled duration, etc.). A validity period value may use one or more time values (e.g., universal time (UTC) integer value such as "1374523500", date/time values such as "Sep. 25, 2018, 7:00 am," etc.) for a beginning of a validity period (e.g., a "not before" value indicating the signing package should not be considered valid until after a specified time), and end of the validity period (e.g., an "expiry" value indicating a time after which the signing package should be considered invalid), and/or a time range for the validity of the signing package. Different validity period values may be indicated using predefined field labels (e.g., "exp" for the expiry time, "nbf" for a "not before" time, etc.).

Issuer—information indicating the content access server 122 that granted the request and/or generated the signing package.

User device ID—this may be a network address, such as an Internet Protocol (IP) address, a Media Access Control (MAC) address, a serial number, or any other indication for the user device 303.

Session Token—information indicating a communication session being held between the user device and a content provider, such as the "website.com" site discussed in the example above.

Security Policy Directive—instruction informing the CDN computing device 301 how to react to certain conditions. One security policy directive may address expiration of the validity period. The policy directive may instruct the CDN computing device 301 to redirect a requesting client to the content access server 122 if a request is received after expiration of the validity period. Another directive may instruct the CDN computing device 301 to continue granting access to requests received after the validity period until further notice, and/or to grant continued access for a predetermined grace period (e.g., for 5 minutes after the validity period expiration, to accommodate clock differences and possible communication delays if the client is requesting a new signing package). Permitting continuous access even after an expiration date/time in the signing package (and/or the signing package could simply omit expiration data), until the CDN computing device 301 receives a command revoking or modifying the access granted in the signing package, may alleviate processing burden for content items (e.g., a video provider like NBC) that are not expected to change access restrictions in the near future.

Other policy directives may also be in the signing package. For example, the content access server 122 could include instructions informing the CDN computing device 301 to dynamically modify the requested content. For example, a user device 303 may sent a content request, and instead of (or in addition to) providing the requested content, the CDN computing device 301 may provide additional content. This may be used, for example, for dynamic advertisement insertion. The CDN computing device 301 may respond to certain content requests (e.g., a user device requesting a particular fragment that is intended to be followed by a commercial break) by sending one or more advertisement files that the user device 303 will simply play as if it were part of the content item.

The signing package may comprise multiple authorizations, each with a corresponding set of the information identified above. For example, the signing package may comprise a first set of information (e.g., content indication, validity period, etc.) authorizing access to a first movie, and a second set of information authorizing access to a second movie. Having multiple sets of information in the signing package may provide a convenient way for the content access server 122 to impose restrictions/grant access to a variety of different items of content, without requiring the user device 303 to manage multiple different cookies.

The contents in the signing package may be assembled as plaintext, such as the following:

\*\*\* Information for Action Movie#35245 \*\*\*
Content ID: "http://my.cdn.com/movies/action/action-movie#35245/*"
Validity Expiry: Dec. 31, 2018
Issuer: Source#25434
Policy Directive: Redirect_After_Expiry to http://access.server.com
\*\*\* Information for Comedy#45465 \*\*\*
Content ID: "http://my.cdn.com/movies/comedy/comedy#45465/*"
Validity Expiry: Dec. 31, 2018
Issuer: Source#25434
Policy Directive: Continue_Grant_After_Expiry

Information for Romance Genre *
Content ID: "http://my.cdn.com/movies/genre/*"
Validity Expiry: Dec. 31, 2018
Issuer: Source#25434
Policy Directive: Continue_Grant_After_Expiry
 Information for 1000 Fragments of Drama#55697 *
Content ID: "*/drama#55697/fragment_0000*"
Validity Expiry: Oct. 31, 2018
Policy Directive: Redirect_After_Expiry to http://access.server.com The plaintext signing package may be signed using any desired signing algorithm. The signing may result in an encrypted form of the signing package plaintext, which may obscure the contents of the plaintext signing package. This may offer protection against unscrupulous users, to hinder their ability to view and edit the signing package without authorization from the content access server 122.

To assist with conformity, the signing package may include the validity period and indication of the content in the signed data, but other data may be excluded from the signed data. The scheme and fully-qualified domain name of the content item (e.g., the movie) may be excluded from the Content Information to assist with compatibility with different types of IPCDN (IP Content Delivery Networks). Similarly, file format extensions may be excluded, as that may assist with user devices 303 and/or content routers 302 that may rewrite URL addresses in routing data requests.

A signing package format may be as follows: {scheme}://{fqdn}/{fragtype}/{enctype}/{contentID{/{relative path addressing manifest or fragment resources}{optional:'?'||query string}

The parameters in braces above may be configuration settings to support a variety of implementations. The "scheme" parameter may indicate a web-based protocol, such as "HTTP" or "HTTPS," that may indicate how a subsequent domain name should be interpreted. The "fqdn" parameter may be a fully-qualified domain name, formatted according to the scheme, and indicating a location of a content server (e.g., content router 302, CDN computing device 301, content access server 122, etc.) that offers a particular content item. The fqdn may be an IP address, a textual name (e.g. "samplefileserver.com/movie_001/files/segment0001.wmv"), a portion of an IP address or textual name, etc. The "fragtype" parameter may indicate a format of a file being requested by the user device 303. The format may be a "transport stream (.ts)" or "basic media file format (bmff)." The "enctype" parameter may indicate a type of encryption that is applied to the content. The enctype parameter may indicate that a CTR AES encryption mode (counter mode in Advanced Encryption Standard) or CBCS (Cypher Block Chaining) encryption is applied, and the encryption type may be determined based on the user device 303 capability or type. The "contentID" parameter may indicate a unique indication of the content item. A particular movie may be given an alphanumerical value that is unique within the CDN, to permit unique indication of the movie. The "contentID" parameter may include a portion of a URL for the content item, and may indicate a folder in order to grant access to all contents of that folder. Content assets may be divided into different folders (e.g., one folder for fragments that use a first encoder, and a second folder for fragments that use a different encoder) for management purposes.

The content access server 122 may send a response 403 to the user device 303, indicating that the request has been granted, and providing the signing package. The response 403 may also comprise a content route URL. The content route URL may comprise scheme, FQDN, and content indication information indicating a content router 302 that the user device 303 should contact to request the content item. The signing package may be included in the response as a query parameter (e.g., a text string or URL query string). Doing so may allow the signing package to remain intact/unaltered as it traverses through the various network elements to reach the user device 303.

The user device 303 may send a content route request 404 to the content route URL that was received in the response 403. The content route request 404 may request the content router 302 to provide a location (e.g., URL or URI) of a specific CDN computing device 301 that will provide the movie to the user device 303. The content router 302 may perform load balancing at this stage, assigning route requests to different CDN computing devices 301. The signing package may be included as a query parameter in this content route request 404 as well.

The content router 302 may send a response 405, informing the user device 303 of the URL of the CDN computing device 301 that will provide the movie to the user device 303. The response 405 may be embodied as an HTTP 302 redirection to the URL of the CDN computing device 301. In addition to the URL of the CDN computing device 301, the response 405 may include a copy of the signing package as a query parameter.

The user device 303 may send a content request 406 to the CDN computing device 301 that was indicated by the content route response 405. The content request 406 may include the signing package as a query parameter, and may comprise a request for a manifest file or audiovideo fragment file corresponding to the requested content (e.g., a movie). The content request may include an indication of the requested content and the signing package—one example may be as follows:

httpScheme://fqdn/path?URLSigningPackage=[insert package]

in which the "httpScheme://fqdn/path" parameter may indicate the path (or partial path) of the requested content, and the "URISigningPackage=[insert package]" parameter may provide a copy of the signing package.

The CDN computing device 301 may determine whether the request is for a particular audiovideo fragment (e.g., a file containing 2 seconds of audio and video for the movie) or a manifest file (e.g., a file containing a listing of file names and addresses for audiovideo fragments of the movie). If the request is for a manifest file, the CDN computing device 301 may send a response 408 containing the requested manifest, without requiring any verification of the signing package (e.g., the CDN might not authenticate manifest requests, and instead may simply provide whatever manifest is requested. The initial request from a client might always be for a manifest, and the signing package may comprise information granting access to fragments indicated in the manifest). If the request is for a fragment, the CDN computing device 301 may examine the signing package, determine the content and fragment file being requested and the various parameters in the signing package, and confirm that the fragment request is consistent with the parameters in the signing package (e.g., the request is being made within the validity period, is for the correct content item, is for the correct version of the content item, is for the correct user device 303 or device type, etc.). The CDN computing device 301 may check some or all of these parameters, depending on configuration.

If the content request 406 is made within the validity period and/or complies with any other applicable restrictions, the CDN computing device 301 may verify 407 the requested access to the content, and may send a response 408 comprising the requested fragment. This may comprise sending an audiovideo file containing 2 seconds of encoded audiovisual content for the movie. The response 408, which may be embodied as an HTTP 200 OK response, may also include an HTTP SET COOKIE instruction, instructing the user device 303 to store a copy of the signing package as a cookie for the URL of the requested content (or for the CDN computing device 301). Legacy user devices 303 may already be configured to handle cookies for various websites, so storing the signing package as a cookie may allow those user devices 303 to benefit from the signing package content authorization system without requiring new dedicated software. The copy of the signing package may be an unmodified copy that is the same as the signing package included in the content request 406. The validity period and expiry information in the copy may be the same as in the signing package that was in the content request 406.

The user device 303 may receive the response 408, and for a response 408 that comprises a manifest file, process the manifest file to prepare for playback (e.g., store the manifest file and indicate a starting point within the manifest file for playback), and store the signing package as a cookie 409 to be used with future requests to the CDN computing device 301. Since a manifest file request may be granted without verifying the signing package, this may result in the cookie being stored prior to the user device 303 requesting a fragment. If the user device 303 is configured to not store cookies, then the signing package may simply be included in the HTTP communications with the user device 303 as a parameter (e.g., a URL field) that the user device 303 will reuse in its request. The signing package may also or alternatively be included in the manifest file that is delivered to the requesting user device 303, and indicate to the user device that the signing package is part of the URL of the content item. Accordingly, when the user device 303 consults the manifest file to prepare a request for the content item, the user device 303 may include the signing package as part of the URL being used to address the CDN computing device 301. The user device 303 might not even be aware that a portion of the URL in the message is actually a signing package.

The user device 303 may send subsequent content requests 410, the CDN computing device 301 may verify the subsequent content requests 411, and the CDN may send subsequent content responses 412, repeating the signaling in 406-408 to provide playback of the movie to the user device 303. This repeating sequence of signals may continue throughout normal playback of the movie, with the user device 303 requesting new file fragments as playback continues, and/or requesting new ones after the user chooses a fast-forward, rewind, or jumping command to being playback from a different point in the movie. With each of the subsequent content requests 410 and responses 412, the same unmodified copy of the signing package may be passed back-and-forth.

The signing package was included as a query parameter in the initial content request 406, and in the subsequent content requests 410 the signing package was included as a cookie. The CDN computing device 301 may react differently depending on how the signing package is received. If the signing package is received as a query parameter, the CDN computing device 301 may assume that this is an initial request, and may ensure to include the SET COOKIE instruction to cause the storage of the copy of the signing package as a cookie. However, if the signing package is received as a cookie, the CDN computing device 301 may determine that the requesting user device 303 has already stored the signing package as a cookie, and that a further SET COOKIE command might not be necessary. If a signing package is received as both a query parameter and as a cookie, the CDN computing device 301 may determine which of the two packages is more current or is valid, and if the valid package was received as the query parameter, then a new SET COOKIE command may be issued to update the user device 303 cookie. The CDN computing device 301 may be configured to automatically give preference to the query parameter in the request 410 over any cookie that is provided in the content request 410, as this may be useful if the user device 301 cookie is out of date (e.g., following a channel change, and before a new cookie is stored for the new channel, the stored cookie might be for a previous channel). So, if a signing package is received as both a query parameter and a cookie, the CDN computing device 301 may act on the query parameter and disregard the cookie.

In FIG. 4B, the user device 303 may issue another content request 413, similar to the content request 410. The content request 413 may request an updated manifest file or a new audiovisual fragment file for the movie, and may include the signing package as a cookie. However the CDN computing device 301 may determine 414 that the content request 413 is for a fragment (as noted above, manifest file requests may simply be honored without requiring access verification), and has occurred outside of the validity period indicated by the signing package. This may be based on a time the content request 413 was sent by the user device 303, a time the content request 413 was received or processed by the CDN computing device 301, or using any other desired time associated with the content request 413.

If access is denied (e.g., in view of the various access parameters discussed above), the CDN computing device 301 may send a different response 415 to the user device 303. In the response 415, the CDN computing device 301 may include a redirect command (e.g., as an HTTP 302 or 301 redirect), directing the user device 303 to the URL of the content access server 122 (which may be indicated in the policy directive in the signing package). The response 415 may also include the signing package as a query parameter, and may include a SET command to cause the user device 303 to erase the current cookie that it has stored for the CDN computing device 301 (or for the URL of the content).

The user device 303 may erase the cookie 416, and may act on the redirect by sending a new request 417 to the content access server 122. The new request 417 may be an access refresh request, requesting that the content access server 122 issue a new signing package, with a new validity period, to the user device 303. The new request 417 may include the signing package as a query parameter.

The content access server 122 may receive the new request 417, verify 418 that the user device 303 and/or its user is authorized to continue to access the movie, and may generate a new signing package for the user device 303. The new signing package may have the same parameters as the prior version, although the new signing package may contain a new expiry date/time for a new validity period and/or provide a new location from which to obtain the content. The content access server 122 may also instruct the CDN computing device 301 (e.g., via a message from the content access server 122) regarding the access parameters for the content, such as by providing the security policy directive discussed above.

The content access server 122 may send a response 419, which may contain a redirect command to cause the user device 303 to access the content router 302 (or the CDN computer device 301 if the content is served by a non-caching origination layer) again for continued access to the content item (e.g., the requested movie). The response 419 may also include the new signing package as a query parameter.

The user device 303 may send a new content route request 420 to the content router 302, similar to content route request 404 but using the new signing package as a query parameter. The content router 302 may respond by sending a response 421 containing a URL of a CDN computing device 301 that will provide the movie (which may be the same CDN computing device 301 that was previously servicing the user device 303, or may be a different CDN computing device 301 based on the content router 302 load balancing).

The user device 303 may send a content request 422 to the CDN computing device 301. Similar to the request 406, the content request 422 may comprise the signing package as a query parameter.

The CDN computing device 301 may verify 423 that the request 422 is in conformance with the access parameters (e.g., that the request is within the validity period indicated in the signing package), and may send a response 424 comprising the requested manifest file or fragment file, as well as a SET COOKIE command to cause the user device 303 to store a copy of the new signing package as a cookie. As before, this cookie may be an unmodified copy of the signing package that was in the request 422.

The user device 303 may store 425 the new signing package as a cookie, and the playback signaling may continue in a similar fashion as described in the signals 410-412 above.

If the content access server 122 determines that a request for content should be denied (e.g., determination 418), then the content access server 122 may simply respond by sending a message to that effect. The message may take the form of an HTTP 401 error/unauthorized message. Following receipt of such a message, the user device 303 may simply terminate playback, or inform the user of the error and await resolution.

Figure 4C:
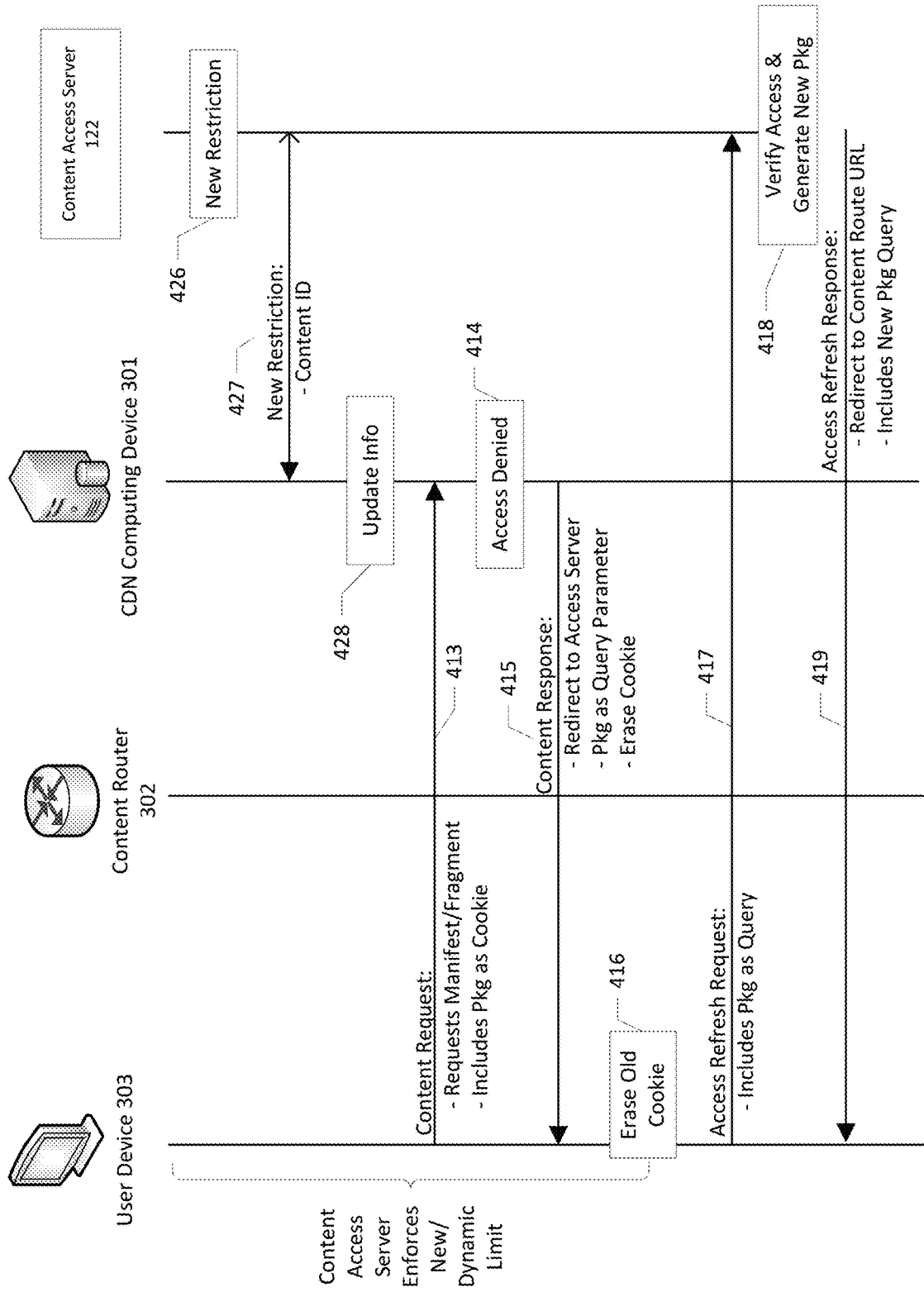

A content source (e.g., content origin 305) may also decide to revoke and/or modify access that may have been previously granted. This may be useful if, for example, dynamic conditions cause a change to previously-determined access restrictions (e.g., due to sufficient attendance at a sporting event, a previously-imposed geographic blackout is to be lifted). FIG. 4C shows an example signaling algorithm flow for such a dynamic change in access restrictions. At 426, a change in access restrictions may be determined. The content access server 122 (or a parameter enforcement computing device 304 or content origin 305) may receive an indication that stadium attendance for a sporting event has surpassed a required minimum for releasing a blackout restriction in a geographic area around the stadium. The indication may be a message sent from a source of the sporting event's video stream, and may actually be embedded in the sporting event's video stream itself. A parameter enforcement computing device 304, or content origin 305, responsible for the sporting event may monitor the video stream of the sporting event, and may detect the embedded indication that the blackout is to be lifted.

The content access server 122 (or other device such as content origin 305) may transmit a message 427 to the CDN computing device 301, informing the CDN computing device 301 of a change to the access restrictions of a content item indicated in the message. The message may comprise a modification to an access permission of a previously-granted signing package (which may cause the CDN to modify the signing package in a future request). However, the message need not contain the actual change, and may simply indicate that the previously-granted signing package should be treated as invalid for future requests. The message may also include additional information, such as an indication of the user device 303 to which the change applies, indication of the affected content item, indication of the signing package itself, etc. The CDN computing device 301 may update its own information 428 to indicate that the next request for the indicated content item (and/or from the particular user device 303, or using the indicated signing package) should be denied. Such a message 427 may be useful for providing an update to access restrictions. For example, if attendance at a sporting event satisfies a threshold needed to lift a blackout restriction, then the message 427 may be sent.

A subsequent request for the content item may be made, and the signaling sequence may comprise the signaling 413-417 discussed above. The CDN computing device 301 may deny the subsequent content request (e.g., a request 413 may be denied 414) for that content item. The denial 414 may cause the user device 303 to erase the previous cookie 416 and request a new signing package 417, as described above, from the content access server 122. A new signing package may be generated 418 if access is to be permitted (e.g., with new restrictions), or simply denied if access to the content item is no longer to be granted.

Lifting the blackout is just one example of a dynamic change in access restriction. Another may be due to a change in schedule (e.g., a program originally scheduled for transmission in one time range is moved to another, or has the time range changed). If a sporting event runs long, and extends beyond a scheduled end time, the service offering the sporting event may wish to update the access restriction to allow user devices 303 to continue receiving the sporting event until its conclusion. Any desired reason for changing an access restriction may be supported using the message 427 and associated signaling above.

Access may also be granted even before a user device 303 actually requests the content item. The content access server 122, user device 303, or other element in the system may monitor a user's content history and identify additional content that may be of interest, to predict the user behavior and to preposition content permissions. If a user is a regular viewer of a particular sit-com, and a new episode becomes available or scheduled, then a signing package for the new episode may automatically be generated by the content access server 122 and provided to the user device 303. The signaling in steps 402-403 may be performed in advance of an actual request for the content item, and this may serve to further streamline the process if/when the user actually chooses to request the new episode.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
receiving, by a computing device and from a user device, a manifest file request comprising a uniform resource signing package as a query parameter to allow it to remain unaltered as the manifest file request is routed to the computing device, wherein the uniform resource signing package comprises information indicating a requested content item;
verifying, based on the uniform resource signing package and the manifest file request, that the user device is to be permitted access to the requested content item;
sending, by the computing device, based on the verifying, and to the user device, a response comprising a manifest file for the requested content item, wherein the manifest file comprises the uniform resource signing package and a listing of fragments of the requested content item; and
receiving, from the user device, a plurality of fragment requests for the fragments of the requested content item, wherein each of the fragment requests comprises a copy of the uniform resource signing package as a query parameter.

2. The method of claim 1, further comprising:
sending a plurality of responses, wherein each of the plurality of responses comprises an instruction to store a same copy of the uniform resource signing package as a cookie.

3. The method of claim 1, further comprising:
receiving a subsequent request from the user device and for the requested content item; and
sending, to the user device, a response to the subsequent request that:
denies the subsequent request; and
redirects the user device to an access server that provided the user device with the uniform resource signing package.

4. The method of claim 1, wherein the query parameter is a uniform resource locator (URL) query string.

5. The method of claim 1, further comprising:
receiving a message from an access server that generated the uniform resource signing package, wherein the message comprises a modification to an access permission comprised in the uniform resource signing package; and
denying, based on the message, a subsequent request from the user device and for the requested content item.

6. The method of claim 1, wherein the manifest file comprises a uniform resource locator (URL) for the requested content item, and the uniform resource signing package is included in the URL as a query parameter.

7. The method of claim 1, wherein the sending the response comprising the manifest file comprises sending the manifest file in response to the manifest file request without using the uniform resource signing package to determine whether to grant the manifest file request.

8. A method comprising:
receiving, by a computing device and from a user device, a request for a manifest file for a requested content item, wherein the request comprises path information for the requested content item, and wherein, appended to the path information, is a query string comprising:
signed information indicating access parameters for the user device and the requested content item;
verifying, based on the request, that the user device has access to the requested content item;
sending, by the computing device and to the user device, the manifest file, wherein the manifest file comprises a copy of the signed information indicating the access parameters for the user device and the requested content item; and
receiving a plurality of fragment requests for fragments of the requested content item, wherein each of the fragment requests comprises a copy of the signed information.

9. The method of claim 8, wherein the manifest file indicates that a uniform resource signing package, comprising the signed information, is part of a uniform resource locator (URL) address in the manifest file.

10. The method of claim 8, further comprising:
monitoring a video stream of the requested content item;
determining, based on the monitored video stream, that a change to the access parameters is needed; and
sending a message indicating that a change to the access parameters is needed.

11. The method of claim 10, wherein the change to the access parameters comprises a change to a validity period that is indicated in the query string.

12. The method of claim 8, further comprising communicating, by the computing device and with one or more parameter enforcement computing devices, to determine whether the request should be granted.

13. The method of claim 8, further comprising:
determining that an access parameter for the requested content item is to be changed;
denying a subsequent request from the user device; and
redirecting the user device to obtain a new signing package that is based on a changed access parameter.

14. A computing device comprising:
one or more processors; and
memory storing instructions that, when executed by the one or more processors, configure the computing device to:
receive, from a user device, a manifest file request comprising a uniform resource signing package as a query parameter to allow it to remain unaltered as the manifest file request is routed to the computing device, wherein the uniform resource signing package comprises information indicating a requested content item;
verify, based on the uniform resource signing package and the manifest file request, that the user device is to be permitted access to the requested content item;
send, based on the verifying and to the user device, a response comprising a manifest file for the requested content item, wherein the manifest file comprises the uniform resource signing package and a listing of fragments of the requested content item; and
receive, from the user device, a plurality of fragment requests for the fragments of the requested content item, wherein each of the fragment requests comprises a copy of the uniform resource signing package as a query parameter.

15. The computing device of claim 14, wherein the instructions, when executed by the one or more processors, further configure the computing device to:
send a plurality of responses, wherein each of the plurality of responses comprises an instruction to store a same copy of the uniform resource signing package as a cookie.

16. The computing device of claim 14, wherein the instructions, when executed by the one or more processors, further configure the computing device to:

receive a subsequent request from the user device and for the requested content item; and send, to the user device, a response to the subsequent request that:

denies the subsequent request; and redirects the user device to an access server that provided the user device with the uniform resource signing package.

17. The computing device of claim 14, wherein the query parameter is a uniform resource locator (URL) query string.

18. The computing device of claim 14, wherein the instructions, when executed by the one or more processors, further configure the computing device to:

receive a message from an access server that generated the uniform resource signing package, wherein the message comprises a modification to an access permission comprised in the uniform resource signing package; and deny, based on the message, a subsequent request from the user device and for the requested content item.

19. The computing device of claim 14, wherein the manifest file comprises a uniform resource locator (URL) for the requested content item, and the uniform resource signing package is included in the URL as a query parameter.

20. The computing device of claim 14, wherein the instructions, when executed by the one or more processors, further configure the computing device to send the response comprising the manifest file by sending the manifest file in response to the manifest file request without using the uniform resource signing package to determine whether to grant the manifest file request.

21. A system comprising:

a computing device and a user device, wherein the computing device comprises: one or more processors; and memory storing instructions that, when executed by the one or more processors of the computing device, configure the computing device to:

receive, from the user device, a manifest file request comprising a uniform resource signing package as a query parameter to allow it to remain unaltered as the manifest file request is routed to the computing device, wherein the uniform resource signing package comprises information indicating a requested content item;

verify, based on the uniform resource signing package and the manifest file request, that the user device is to be permitted access to the requested content item;

send, based on the verifying and to the user device, a response comprising a manifest file for the requested content item, wherein the manifest file comprises the uniform resource signing package and a listing of fragments of the requested content item; and receive, from the user device, a plurality of fragment requests for the fragments of the requested content item, wherein each of the fragment requests comprises a copy of the uniform resource signing package as a query parameter, and wherein the user device comprises:

one or more processors; and memory storing instructions that, when executed by the one or more processors of the user device, configure the user device to send the manifest file request.

22. The system of claim 21, wherein the instructions in the memory of the computing device, when executed by the one or more processors of the computing device, configure the computing device to:

send a plurality of responses, wherein each of the plurality of responses comprises an instruction to store a same copy of the uniform resource signing package as a cookie.

23. The system of claim 21, wherein the instructions in the memory of the computing device, when executed by the one or more processors of the computing device, configure the computing device to:

receive a subsequent request from the user device and for the requested content item; and send, to the user device, a response to the subsequent request that:

denies the subsequent request; and redirects the user device to an access server that provided the user device with the uniform resource signing package.

24. The system of claim 21, wherein the query parameter is a uniform resource locator (URL) query string.

25. The system of claim 21, wherein the instructions in the memory of the computing device, when executed by the one or more processors of the computing device, configure the computing device to:

receive a message from an access server that generated the uniform resource signing package, wherein the message comprises a modification to an access permission comprised in the uniform resource signing package; and deny, based on the message, a subsequent request from the user device and for the requested content item.

26. The system of claim 21, wherein the manifest file comprises a uniform resource locator (URL) for the requested content item, and the uniform resource signing package is included in the URL as a query parameter.

27. The system of claim 21, wherein the instructions in the memory of the computing device, when executed by the one or more processors of the computing device, configure the computing device to send the response comprising the manifest file by sending the manifest file in response to the manifest file request without using the uniform resource signing package to determine whether to grant the manifest file request.

28. One or more non-transitory, computer-readable media storing instructions that, when executed, cause:

receiving, by a computing device and from a user device, a manifest file request comprising a uniform resource signing package as a query parameter to allow it to remain unaltered as the manifest file request is routed to the computing device, wherein the uniform resource signing package comprises information indicating a requested content item;

verifying, based on the uniform resource signing package and the manifest file request, that the user device is to be permitted access to the requested content item;

sending, by the computing device, based on the verifying, and to the user device, a response comprising a manifest file for the requested content item, wherein the manifest file comprises the uniform resource signing package and a listing of fragments of the requested content item; and receiving, from the user device, a plurality of fragment requests for the fragments of the requested content item, wherein each of the fragment requests comprises a copy of the uniform resource signing package as a query parameter.

29. The one or more non-transitory, computer-readable media of claim 28, wherein the instructions, when executed, further cause:

sending a plurality of responses, wherein each of the plurality of responses comprises an instruction to store a same copy of the uniform resource signing package as a cookie.

30. The one or more non-transitory, computer-readable media of claim 28, wherein the instructions, when executed, further cause:
receiving a subsequent request from the user device and for the requested content item; and
sending, to the user device, a response to the subsequent request that:
denies the subsequent request; and
redirects the user device to an access server that provided the user device with the uniform resource signing package.

31. The one or more non-transitory, computer-readable media of claim 28, wherein the query parameter is a uniform resource locator (URL) query string.

32. The one or more non-transitory, computer-readable media of claim 28, wherein the instructions, when executed, further cause:
receiving a message from an access server that generated the uniform resource signing package, wherein the message comprises a modification to an access permission comprised in the uniform resource signing package; and
denying, based on the message, a subsequent request from the user device and for the requested content item.

33. The one or more non-transitory, computer-readable media of claim 28, wherein the manifest file comprises a uniform resource locator (URL) for the requested content item, and the uniform resource signing package is included in the URL as a query parameter.

34. The one or more non-transitory, computer-readable media of claim 28, wherein the instructions, when executed, further cause the sending the response comprising the manifest file by causing sending the manifest file in response to the manifest file request without using the uniform resource signing package to determine whether to grant the manifest file request.

35. A computing device comprising:
one or more processors; and
memory storing instructions that, when executed by the one or more processors, configure the computing device to:
receive, from a user device, a request for a manifest file for a requested content item, wherein the request comprises path information for the requested content item, and wherein, appended to the path information, is a query string comprising signed information indicating access parameters for the user device and the requested content item;
verify, based on the request, that the user device has access to the requested content item;
send, to the user device, the manifest file, wherein the manifest file comprises a copy of the signed information indicating the access parameters for the user device and the requested content item; and
receive a plurality of fragment requests for fragments of the requested content item, wherein each of the fragment requests comprises a copy of the signed information.

36. The computing device of claim 35, wherein the manifest file indicates that a uniform resource signing package, comprising the signed information, is part of a uniform resource locator (URL) address in the manifest file.

37. The computing device of claim 35, wherein the instructions, when executed by the one or more processors, configure the computing device to:
monitor a video stream of the requested content item;
determine, based on the monitored video stream, that a change to the access parameters is needed; and
send a message indicating that a change to the access parameters is needed.

38. The computing device of claim 37, wherein the change to the access parameters comprises a change to a validity period that is indicated in the query string.

39. The computing device of claim 35, wherein the instructions, when executed by the one or more processors, configure the computing device to communicate, with one or more parameter enforcement computing devices, to determine whether the request should be granted.

40. The computing device of claim 35, wherein the instructions, when executed by the one or more processors, configure the computing device to:
determine that an access parameter for the requested content item is to be changed;
deny a subsequent request from the user device; and
redirect the user device to obtain a new signing package that is based on a changed access parameter.

41. A system comprising:
a computing device and a user device,
wherein the computing device comprises:
one or more processors; and
memory storing instructions that, when executed by the one or more processors of the computing device, configure the computing device to:
receive, from the user device, a request for a manifest file for a requested content item, wherein the request comprises path information for the requested content item, and wherein, appended to the path information, is a query string comprising signed information indicating access parameters for the user device and the requested content item;
verify, based on the request, that the user device has access to the requested content item;
send, to the user device, the manifest file, wherein the manifest file comprises a copy of the signed information indicating the access parameters for the user device and the requested content item; and
receive a plurality of fragment requests for fragments of the requested content item, wherein each of the fragment requests comprises a copy of the signed information, and
wherein the user device comprises:
one or more processors; and
memory storing instructions that, when executed by the one or more processors of the user device, configure the user device to send the request for the manifest file.

42. The system of claim 41, wherein the manifest file indicates that a uniform resource signing package, comprising the signed information, is part of a uniform resource locator (URL) address in the manifest file.

43. The system of claim 41, wherein the instructions in the memory of the computing device, when executed by the one or more processors of the computing device, configure the computing device to:
monitor a video stream of the requested content item;
determine, based on the monitored video stream, that a change to the access parameters is needed; and
send a message indicating that a change to the access parameters is needed.

44. The system of claim 43, wherein the change to the access parameters comprises a change to a validity period that is indicated in the query string.

45. The system of claim 41, wherein the instructions in the memory of the computing device, when executed by the one or more processors of the computing device, configure the computing device to communicate, with one or more parameter enforcement computing devices, to determine whether the request should be granted.

46. The system of claim 41, wherein the instructions in the memory of the computing device, when executed by the one or more processors of the computing device, configure the computing device to:
 determine that an access parameter for the requested content item is to be changed;
 deny a subsequent request from the user device; and
 redirect the user device to obtain a new signing package that is based on a changed access parameter.

47. One or more non-transitory, computer-readable media storing instructions that, when executed, cause:
 receiving, by a computing device and from a user device, a request for a manifest file for a requested content item, wherein the request comprises path information for the requested content item, and wherein, appended to the path information, is a query string comprising signed information indicating access parameters for the user device and the requested content item;
 verifying, based on the request, that the user device has access to the requested content item;
 sending, by the computing device and to the user device, the manifest file, wherein the manifest file comprises a copy of the signed information indicating the access parameters for the user device and the requested content item; and
 receiving a plurality of fragment requests for fragments of the requested content item, wherein each of the fragment requests comprises a copy of the signed information.

48. The one or more non-transitory, computer-readable media of claim 47, wherein the manifest file indicates that a uniform resource signing package, comprising the signed information, is part of a uniform resource locator (URL) address in the manifest file.

49. The one or more non-transitory, computer-readable media of claim 47, wherein the instructions, when executed, cause:
 monitoring a video stream of the requested content item;
 determining, based on the monitored video stream, that a change to the access parameters is needed; and
 sending a message indicating that a change to the access parameters is needed.

50. The one or more non-transitory, computer-readable media of claim 49, wherein the change to the access parameters comprises a change to a validity period that is indicated in the query string.

51. The one or more non-transitory, computer-readable media of claim 47, wherein the instructions, when executed, cause communicating, by the computing device and with one or more parameter enforcement computing devices, to determine whether the request should be granted.

52. The one or more non-transitory, computer-readable media of claim 47, wherein the instructions, when executed, cause:
 determining that an access parameter for the requested content item is to be changed;
 denying a subsequent request from the user device; and
 redirecting the user device to obtain a new signing package that is based on a changed access parameter.

\* \* \* \* \*